United States Patent
Nisbett et al.

(10) Patent No.: US 9,657,368 B2
(45) Date of Patent: May 23, 2017

(54) METAL LEACH AND RECOVERY PROCESS

(71) Applicant: BASF SE, Ludwigshafen (DE)

(72) Inventors: Andrew Nisbett, Tucson, AZ (US);
Stephen Adkins, Cleckheaton (GB);
Ian John Flanagan, Doncaster (GB);
Alexsandro Berger, Mannheim (DE)

(73) Assignee: BASF SE, Ludwigshafen (DE)

( * ) Notice: Subject to any disclaimer, the term of this patent is extended or adjusted under 35 U.S.C. 154(b) by 300 days.

(21) Appl. No.: 14/416,748

(22) PCT Filed: Aug. 7, 2013

(86) PCT No.: PCT/EP2013/066528
§ 371 (c)(1),
(2) Date: Jan. 23, 2015

(87) PCT Pub. No.: WO2014/023755
PCT Pub. Date: Feb. 13, 2014

(65) Prior Publication Data
US 2015/0203935 A1  Jul. 23, 2015

Related U.S. Application Data

(60) Provisional application No. 61/681,641, filed on Aug. 10, 2012.

(30) Foreign Application Priority Data

Aug. 10, 2012  (EP) .................................... 12180009

(51) Int. Cl.
*C22B 3/44* (2006.01)
*B01D 21/01* (2006.01)
(Continued)

(52) U.S. Cl.
CPC ................ *C22B 3/44* (2013.01); *B01D 21/01* (2013.01); *C22B 3/04* (2013.01); *C22B 3/205* (2013.01);
(Continued)

(58) Field of Classification Search
None
See application file for complete search history.

(56) References Cited

U.S. PATENT DOCUMENTS 6,171,564 B1  1/2001  Jones
7,799,294 B2  9/2010  Kordosky et al.
(Continued)

FOREIGN PATENT DOCUMENTS

AU  775649 B2  11/2002
EP  0 102 760 A2  3/1984
(Continued)

OTHER PUBLICATIONS

U.S. Appl. No. 14/787,119, filed Oct. 26, 2015, Berger et al.
International Search Report issued on Sep. 13, 2013 in the corresponding International Application No. PCT/EP2013/066528.

*Primary Examiner* — Melissa Swain
(74) *Attorney, Agent, or Firm* — Oblon, McClelland, Maier & Neustadt, L.L.P.

(57) ABSTRACT

The present invention relates to a metal leach and recovery process. The process involves subjecting a metal bearing material to a reactive process by combining said metal bearing material with a leaching agent to liberate at least one metal value and forming a first aqueous leach pulp. This first aqueous leach pulp is subjected to a solid liquid separation step thereby providing a first clarified aqueous leach solution and a second aqueous leach pulp. The first clarified aqueous leach solution is then subjected to solvent extraction thereby
(Continued)

obtaining the first aqueous raffinate. The second aqueous leach pulp is subjected to at least two further solid liquid separation steps of which some or all are in a counter current decantation (CCD) arrangement. Each of the solid liquid separation steps of the CCD arrangement results in an aqueous liquor and aqueous suspension of solids wherein each aqueous suspension of solids resulting from each solid liquid separation step of the CCD arrangement is passed to the subsequent solid liquid separation step and the suspension of solids resulting from the final solid liquid separation step is removed from the process. Further, each aqueous liquor resulting from each solid liquid separation step of the CCD arrangement is passed to the previous solid liquid separation step. The further solid liquid separation steps result in at least one further clarified aqueous leach solution. The at least one further clarified aqueous leach solution is/are subjected to solvent extraction thereby obtaining at least one further aqueous raffinate. At least a portion of the one or more of the at least one further aqueous raffinates is fed into the final solid liquid separation is of the CCD arrangement. The process provides a flocculation system comprising either: (i) addition of an organic polymeric flocculant to or prior to at least one solid liquid separation step, which polymeric flocculant is formed from 2-acrylamido-2-methylpropane sulphonic acid (ATBS) or salts thereof as a homopolymer or copolymer with at least one water-soluble ethylenically unsaturated monomer; or (ii) addition of an organic polymeric flocculant and at least one support agent to or prior to at least one solid liquid separation step, which at least one support agent is selected from at least one of the group consisting of oxidizing agents, reducing agents, irradiation and free radical producing agents. The process provides significantly improved metal extraction and recovery.

12 Claims, 3 Drawing Sheets

(51) Int. Cl.
     *C22B 3/20*      (2006.01)
     *C22B 15/00*     (2006.01)
     *C22B 3/04*      (2006.01)
(52) U.S. Cl.
     CPC ......... *C22B 15/0084* (2013.01); *Y02P 10/234* (2015.11); *Y02P 10/236* (2015.11)

(56) References Cited

U.S. PATENT DOCUMENTS

| | | |
|---|---|---|
| 2002/0004023 A1 | 1/2002 | Jones |
| 2005/0031512 A1 | 2/2005 | Kordosky et al. |
| 2010/0319490 A1 | 12/2010 | Kordosky et al. |

FOREIGN PATENT DOCUMENTS

| | | |
|---|---|---|
| EP | 0 126 528 A2 | 11/1984 |
| EP | 0 150 933 A2 | 8/1985 |
| EP | 1 752 550 A1 | 2/2007 |
| WO | WO 97/29316 A1 | 8/1997 |
| WO | WO 01/55228 A1 | 8/2001 |
| WO | WO 2011/125047 A1 | 10/2011 |

METAL LEACH AND RECOVERY PROCESS

The present invention relates to a process of leaching and recovery of metal from metal bearing materials. The process involves reacting a metal bearing material with a leaching agent thereby obtaining a first aqueous leach pulp which comprises a mixture of leached solids, aqueous leach solution containing at least one metal value, said leaching agent and water. According to the process this first aqueous leach pulp is subjected to solids liquid separation to provide a first clarified aqueous leach solution and a second aqueous leach pulp. This second aqueous leach pulp is subjected to a least two further solid liquid separation steps in order to recover at least one further clarified aqueous leach solution. The respective aqueous leach solutions are subjected to solvent extraction to extract the metal values into a non-aqueous liquid containing a metal extraction agent and the remaining aqueous solution is known as an aqueous raffinate which can be recycled into the process. Significant improvements in efficiency are achieved by the present invention in employing a flocculation system for at least one of the solid liquid separation stages.

Hydrometallurgical treatment of metal bearing materials, such as metal ores, metal bearing concentrates, and other metal bearing substances, has been well established for many years. Further, leaching of metal bearing materials is fundamental to the extraction of metals from metal bearing materials. Typically, such leaching processes involve contacting metal bearing materials with an aqueous solution containing at least one leaching agent which reacts with metal or metals in the metal bearing material thereby extracting it into solution.

For example, in copper leaching operations, such as for instance, in the agitation leaching of copper oxide, aqueous acid, for instance sulphuric acid, is contacted with the copper oxide minerals. During the leaching process, acid in the leach solution is consumed and copper is dissolved thereby increasing the copper content of the aqueous solution.

The aqueous leach solution containing the leached metal can then be treated by a known process referred to as solvent extraction. Solvent extraction involves contacting the aqueous leach solution with an immiscible non-aqueous solution containing a metal extraction reagent. The metal extraction reagent extracts the metal from the aqueous phase into the non-aqueous phase. In the case where the metal is copper and the leaching agent is sulphuric acid, for every tonne of copper removed from the leach solution about 1.5 tonnes of sulphuric acid is generated in the leach solution.

Leaching agents are often recycled back to the leaching process to dissolve more metal. The more leaching agent that can be recycled, the less need there is to introduce new leaching agent. A standard agitation leaching process for metal, such as copper, followed by solvent extraction, involves the dilution of the leach solution to a lesser or greater extent with water in conjunction with the solid liquid separation process needed to provide a clarified leach liquor and tailings. The diluted clarified leach solution is then transferred to one or more solvent extraction plants depending on the volume of leach solution and the capacity of each plant. The diluted leach solution undergoes solvent extraction wherein metal, e.g. copper, is removed from, and the leaching agent, e.g. sulphuric acid, concentration is increased in, the aqueous phase.

A portion of this metal (e.g. copper) depleted, leaching agent (e.g. acid) containing aqueous phase, now called the raffinate, is generally then recycled back to the leaching process. The other portion may be recycled to the front of the solid liquid separation process where it dilutes the leach solution exiting the agitation leaching process. Depending on the leaching agent (e.g. acid) balance across the whole process some of this recycled aqueous phase may be partially neutralised.

The leach solution from an agitation leaching process is normally diluted during the solid liquid separation step in order to maximise the washing of the leached solids so that metal lost to the solids is minimised. During solvent extraction as the metal is extracted, leaching agent (e.g. acid) concentration builds in the aqueous phase and the reaction becomes self-limiting in equilibrium. However, in view of the initial dilution to maximise metal recovery from the leached solids, the amount of leaching agent (e.g. acid) regenerated is lower in concentration than it would have been if the leach solution had not been diluted in the washing of the leached solids. Unfortunately, the lower the concentration of leaching agent (e.g. acid) in the recycled raffinate, the more fresh leaching agent (e.g. acid) that needs to be added and this increases the cost of the operation.

U.S. Pat. No. 7,799,294 addresses this disadvantage and provides a process in which an aqueous leach solution is split into two or more portions and subjecting at least one portion to solvent extraction prior to any significant dilution. Typically this process will provide a first aqueous leach solution containing a high concentration of leached metal, often known as a high grade pregnant leach solution (HG-PLS), and a second aqueous leach solution containing a relatively low concentration of leached metal, often known as low-grade pregnant leach solution (LGPLS). This technique enables significantly improved metal extraction and at the same time significantly improved recovery of the leaching agent. Such a process may be referred to as a split circuit. The process of obtaining the LGPLS suitably involves employing a series of solid liquid separation stages in a counter current decantation (CCD) arrangement. This CCD arrangement allows washing of the solids to recover further metal values in addition to leaching agent.

However, the efficiency of solid liquid separation and cost of chemicals used in the process has a significant impact on the commercial viability of the process. It is usual that increased separation of the solids and liquids occurs with an increased number of solid liquid separation stages. It is not uncommon to employ a train of several solid liquid separation stages. However, the greater the number of solid liquid separation stages the greater is the capital expenditure for additional processing equipment, processing time, and chemical usage both in terms of leaching agent and flocculant.

It would be desirable to provide further improvements in the efficiency of metal extraction processes involving leaching. Further, one objective of the present invention is to provide a highly efficient process of metal extraction and at the same time reduce the degree of processing and chemical usage that would otherwise be required.

According to the present invention we provide a metal leach and recovery process comprising:
(a) subjecting a metal bearing material to a reactive process by combining said metal bearing material with a leaching agent to liberate at least one metal value from said metal bearing material and obtain a first aqueous leach pulp comprising a mixture of leached solids and an aqueous leach solution comprising at least one metal value, a leaching agent and water;
(b) subjecting the first aqueous leach pulp to a solid liquid separation step to provide a first clarified aqueous leach solution and a second aqueous leach pulp, wherein the second aqueous leach pulp comprises a greater solids content than the first aqueous leach pulp;

(c) subjecting the first clarified aqueous leach solution to solvent extraction thereby obtaining a first aqueous raffinate;

(d) subjecting the second aqueous leach pulp to at least two further solid liquid separation steps of which some or all of the further solid liquid separation steps are in a counter current decantation (CCD) arrangement in which each solid liquid separation step of the CCD results in an aqueous liquor and an aqueous suspension of solids, wherein each aqueous suspension of solids resulting from each solid liquid separation step of the CCD is passed to the subsequent solid liquid separation step of the CCD and the aqueous suspension of solids resulting from the final solid liquid separation step of the CCD arrangement is removed from the process and wherein each aqueous liquor resulting from each solid liquid separation step of the CCD is passed to the previous solid liquid separation step, in which at least one further clarified aqueous leach solution results from at least one of the further solid liquid separation steps;

(e) subjecting the at least one further clarified aqueous leach solution to solvent extraction thereby obtaining at least one further aqueous raffinate;

(f) feeding at least a portion of the one or more of the at least one further aqueous raffinates into the final solid liquid separation step of the CCD arrangement;

wherein at least one of the solid liquid separation steps is subjected to a flocculation system in which the flocculation system comprises either:

(i) addition of an organic polymeric flocculant to at least one solid liquid separation step, which organic polymeric flocculant is formed from 2-acrylamido-2-methylpropane sulphonic acid (ATBS) or salts thereof as a homopolymer or copolymer with at least one water-soluble ethylenically unsaturated monomer; and/or (ii) addition of an organic polymeric flocculant and at least one support agent to or prior to at least one solid liquid separation step, which at least one support agent is selected from at least one of the group consisting of oxidising agents, reducing agents, irradiation and free radical producing agents.

By addition of the flocculation system prior to the solid liquid separation stage we mean that the flocculation system is applied to the flow line or conduit carrying the solids suspension (e.g. leach pulp or other solids suspension of the CCD arrangement) to the solid liquid separation stage. This may for instance be a conduit carrying the solids suspension to a vessel of the solid liquid separation stage in which the solids are allowed to settle. Alternatively, the flocculation system may be applied directly to the solid liquid separation stage e.g. into the aforementioned vessel.

Flocculation and settling of the solids in suspension can be effected whichever way the flocculation system is applied, either to the solid liquid separation stage or prior to the solid liquid separation stage. The solid liquid separation stage normally involves settling of the solids. This normally occurs within a vessel of the solid liquid separation stage. In general the solids tend to settle to form a bed of settled solids within the vessel and a supernatant of clarified liquor.

Figure 1:
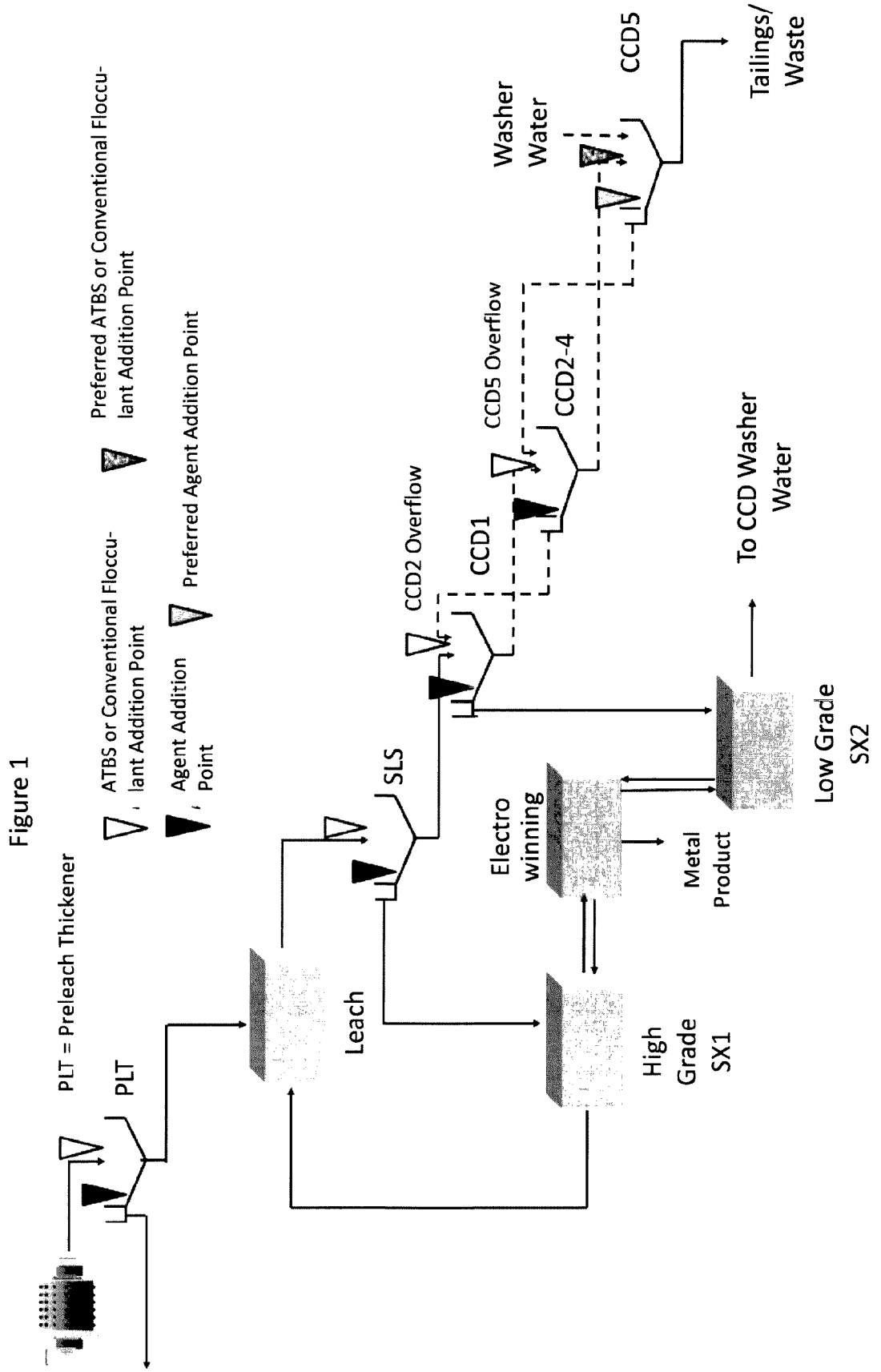
FIG. 1 represents a suitable metal leach and recovery process according to the invention.

A suitable way of conducting the process of the present invention includes applying the flocculation system to or prior to any of the solid liquid separation steps of the process described by U.S. Pat. No. 7,799,294. Suitable addition points for the flocculation system are described herein.

The inventors of the present invention unexpectedly found that the flocculation system defined hereinabove enables significantly improved metal extraction and recovery. Furthermore, the efficiency of the process is improved such that it may be possible to dispense with at least one of the solid liquid separation stages of the CCD arrangement without suffering any significant reduction in concentrations of metal values of the aqueous leach solution.

According to the first aspect of the invention the flocculation system comprises an organic polymeric flocculant formed from 2-acrylamido-2-methylpropane sulphonic acid or salts (ATBS). For purposes of this specification ATBS includes both the free acid and salts thereof. Typically the salts may be ammonium salts or alkali metal salts such as sodium or potassium salts. The organic polymeric flocculant may be formed from the homopolymer of ATBS. Alternatively, the organic polymeric flocculant may be a copolymer of ATBS with at least one water-soluble ethylenically unsaturated non-ionic monomer and/or at least one water-soluble ethylenically unsaturated anionic monomer. Suitably the water soluble monomers have a solubility in water of at least 5 g/100 cc at 25° C. Particularly suitable anionic monomers are selected from ethylenically unsaturated carboxylic acid and sulphonic acid monomers, preferably selected from (meth) acrylic acid, allyl sulphonic acid and their salts. Particularly suitable non-ionic monomers are selected from (meth) acrylamide, hydroxy alkyl esters of (meth) acrylic acid and N-vinyl pyrrolidone. Especially suitable organic polymeric flocculants comprise from 1 mol % to 100 mol % ATBS and from 0 mol % water-soluble ethylenically unsaturated non-ionic and/or anionic monomers.

Preferably in this aspect of the invention the organic polymeric flocculant may be a copolymer of ATBS with acrylamide or methacrylamide.

According to the second aspect of the invention the flocculation system comprises the addition of an organic polymeric flocculant and at least one support agent to or prior to at least one solid liquid separation step, which at least one support agent is selected from at least one of the group consisting of oxidising agents, reducing agents, irradiation and free radical producing agents.

In this aspect of the invention the organic polymeric flocculant may include high molecular weight polymers that are cationic, non-ionic, anionic or amphoteric. Further, the organic polymeric flocculant may be synthetic, natural or seminatural polymer. Typical natural or seminatural polymers include polysaccharides, for instance cationic starch, anionic starch, amphoteric starch and chitosan. One particularly desirable class of natural or seminatural polymers include starch, guar gum, dextran, carboxy methylcellulose or hydroxy ethyl cellulose.

Synthetic polymers suitable as organic polymeric flocculant according to this second aspect of the invention include polyethers, such as polyalkylene oxides. Typically these are polymers with alkyleneoxy repeating units in the polymer backbone. Another suitable class of synthetic polymers include polymers of water-soluble ethylenically unsaturated monomers. Such polymers suitably include anionic polymers that are formed from ethylenically unsaturated carboxylic acid and ethylenically unsaturated sulphonic acid monomers. Preferably, these anionic polymers are formed from one or more of the group consisting of (meth) acrylic acid, allyl sulphonic acid and 2-acrylamido-2-methyl propane sulphonic acid (ATBS) including their salts, optionally in combination with non-ionic co-monomers, preferably selected from (meth) acrylamide, hydroxy alkyl esters of (meth) acrylic acid and N-vinyl pyrrolidone.

Preferred non-ionic polymers are formed from at least one water-soluble non-ionic ethylenically unsaturated monomer selected from the group consisting of (meth) acrylamide, hydroxy alkyl esters of (meth) acrylic acid and N-vinyl pyrrolidone.

Preferred cationic polymers are formed from ethylenically unsaturated monomers selected from diallyl dimethyl ammonium chloride (DADMAC); trimethyl amino propyl (meth) acrylamide chloride (APTAC); methyl chloride quaternary ammonium salt of dimethyl amino ethyl (meth) acrylate (DMAEA.MeCl); optionally in combination with non-ionic comonomers, preferably selected from (meth) acrylamide, hydroxy alkyl esters of (meth) acrylic acid and N-vinyl pyrrolidone. Especially preferred polymers for this aspect of the invention include the homopolymer of sodium acrylate, the homopolymer of acrylamide and a copolymer of sodium acrylate with acrylamide. Another effective flocculation system would employ the ATBS polymer according to the first aspect of the invention as the organic polymeric flocculant at the second aspect of the invention in conjunction with said support agent.

For both the organic polymeric flocculant of the first aspect of the invention and the organic polymeric flocculant synthetic polymers of ethylenically unsaturated monomers of the second aspect of the invention generally the polymer may be of high molecular weight, that is at least 1,000,000 Da and frequently at least 4,000,000 Da or 5,000,000 Da. The molecular weight may be higher than 6,000,000 Da or even higher than 7,000,000 Da. Often the molecular weight will be considerably higher, for instance 10,000,000 Da or greater. The molecular weight may be as high as 15,000,000 Da or higher and in some cases it may be desirable the molecular weight to be up to 20,000,000 Da or even up to 30,000,000 Da or higher. Suitably the aforementioned polymers may exhibit an intrinsic viscosity of at least 4 dl/g. Preferably though, the polymer may have higher intrinsic viscosity, for instance at least 5 dl/g or even at least 7 dl/g and usually at least 10 or 12 dl/g and could be as high as 18 or 20 dl/g or higher. For instance, the intrinsic viscosity may be even as high as 25 or 30 dl/g or higher.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers are measured using a Number 1 suspended level viscometer at 25° C. in 1M buffered salt solution.

In the invention, the polymer of ethylenically unsaturated monomer may be formed by any suitable conventional polymerisation process techniques. The polymers may be prepared for instance as gel polymers by solution polymerisation, which are subsequently dried and comminuted into powder. Alternatively, the polymers may be formed by water-in-oil suspension polymerisation or by water-in-oil emulsion polymerisation techniques to provide polymer beads or water in oil emulsions respectively.

Suitable polymerisation techniques are described in EP 150933, EP 102760, EP 126528, WO 01/55228, and WO 97/29316.

The organic polymeric flocculants of both aspects of the invention are generally water-soluble and may for instance have a solubility in water of at least 5 g/100 cc at 25° C.

Generally, the organic polymeric flocculant may be formed into an aqueous solution before application into the process. An aqueous solution of water-soluble polymer typically may be obtained by dissolving the polymer in water. Suitably, solid particulate polymer, for instance in the form of powder for beads, would be dispersed in water and allowed to dissolve with agitation. This may be achieved using conventional make-up equipment, for instance using the Auto Jet Wet (trademark), supplied by BASF. In the case of water in oil emulsions or water in oil dispersions of polymer, the polymer may be dissolved by inverting the emulsions or dispersions into a suitable dissolution equipment, for instance using EMU equipment, supplied by BASF.

The organic polymeric flocculant in both aspects may be dosed as an aqueous solution at any suitable concentration. It may be desirable to employ a relatively concentrated solution, for instance up to 10% or more based on weight of polymer. Usually though it will be desirable to add the polymer solution at a lower concentration to minimise problems resulting from the high viscosity of the polymer solution and to facilitate distribution of the polymer throughout the suspension. The polymer solution can be added at a relatively dilute concentration, for instance as low as 0.01% by weight of polymer. Typically the polymer solution will normally be used at a concentration between 0.05 and 5% by weight of polymer. Preferably the polymer concentration will be the range 0.1% to 2 or 3%. More preferably the concentration will range from 0.25% to about 1 or 1.5%. Alternatively the organic polymeric flocculant may be added to the suspension in the form of dry particles or instead as a reverse phase emulsion or dispersion. The dry polymer particles would dissolve in the aqueous suspension and the reverse phase emulsion or dispersion should invert directly into the aqueous suspension into which the polymer would then dissolve.

According to both aspects of the invention the doses of organic polymeric flocculant range from 5 grams to 10,000 grams per tonne of material solids. Generally the appropriate dose can vary according to the particular solids composition and content. Preferred doses are in the range 10 to 3,000 grams per tonne, especially between 10 and 1000 grams per tonne, while more preferred doses are in the range of from 60 to 200 or 400 grams per tonne.

The at least one support agent according to the second aspect of the invention is selected from at least one of the group consisting of oxidising agents, reducing agents, irradiation and free radical producing agents.

Suitably the oxidising agent may be selected from perchlorates, hypochlorites, perbromates, hypobromites, periodates, hypoiodites, perborates, percarbonates, persulphates, peracetates, ozone and peroxides. The use of peroxides, ozone, hypochlorites, peracetates, perborates, percarbonate and persulphates have been found to be particularly effective for oxidizing purposes.

Preferred oxidising agents for use in present invention are peroxides and ozone. A particularly preferred peroxide is hydrogen peroxide. Suitably the hydrogen peroxide will be in an aqueous solution containing at least 1% hydrogen peroxide on weight basis, typically at least 5% and often at least 10% and often at least 20%, preferably at least 30% as much as 50 or 60% or more. When ozone is used it is preferred that this is in the form of ozone water. Typically the ozone water would have a concentration of at least 0.1 ppm and usually at least 1 ppm. The concentration may be as much as 1000 ppm but usually effective results are obtained at lower concentrations, such as up to 500 ppm or even up to 100 ppm. Often the concentration will be in the range of between 5 ppm and 50 ppm, for instance between 10 ppm and 40 ppm, especially between 20 ppm and 30 ppm.

The amount of at least one oxidising agent will vary according to the specific process conditions, the type of substrate and flocculant. The oxidising agent preferably should be introduced at a dose in an amount of at least 1 ppm based on weight of agent on volume of the aqueous suspension. The oxidising agent can be effective at low levels for example between 1 and 10 ppm. Generally the support agent will be added in an amount of from at least 100 ppm and in some cases may be at least 1000 ppm based on the volume of the first suspension. In some cases it may be desirable to add significantly higher levels of the oxidising agent, for instance as much as 40,000 or 50,000 ppm or higher. Effective doses usually will be in the range between 150 and 20,000 ppm, especially between 1000 and 15,000 ppm.

When the support agent is a reducing agent it may for instance be sulphites, bisulphites, phosphites, hypophosphites and phosphorous acid etc. These may be provided as the ammonium or alkali metal salts such as sodium or potassium salts.

Suitable free radical agents include chemical compounds selected from the group consisting of ferrous ammonium sulphate, ceric ammonium nitrate etc.

The amount of at least one reducing agent or at least one free radical agent desirably may be in the same ranges as that of the oxidising agent mentioned above.

When the support agent is irradiation it is preferably ultrasonic energy. Suitably the ultrasonic energy may be applied to or prior to the solid liquid separation stage. It is preferable to apply ultrasonic energy anywhere within the settled bed of solids within the vessel all the liquid separation stage. Typically this should mean that the ultrasonic energy should be applied anywhere below the settled bed level. The amount of ultrasonic energy applied is generally regarded as being effective in inducing a decrease in yield stress and/or viscosity for a given solids content of the flocculated material or alternatively inducing an increase in solids for a given yield stress of the flocculated material. The actual amount of ultrasonic energy to be applied may be determined on a thickener by thickener basis and should be generally determined by the particular solids in the suspension or on various operating conditions.

In general the intensity of the ultrasonic energy applied to the bed of solids, the underflow or the recycle stream should be in the range of 10 to 1000 Watts/square centimeter.

Suitably the frequency of the ultrasonic energy applied to the bed of solids, the underflow or the recycle stream should be in the range of 20 KHz to 10 MHz. Preferably the range should be between 20 KHz to 1 MHz (called low frequency ultrasound), more preferably between 20 KHz to 100 KHz.

The at least one support agent may be used in conjunction with at least one control agent. The at least one control agent consists of iia) at least one activator component and/or iib) at least one suppressor component, in which the at least one activator component increases the activity of the oxidising agent and the suppressor component decreases the concentration of the activator component.

When the control agent comprises at least one activator component, the activator component may be any entity which increases the activity of the oxidising agents, reducing agents, irradiation and free radical producing agents. The activator component within the scope of the present invention also includes materials which are either precursors to or can be converted into materials which increase the activity of those agents. For instance, the activator component may interact with the oxidising agent to form oxidising radicals. Suitably the formation of these oxidising radicals will be at a faster rate and/or provide an increased concentration of oxidising radicals than the oxidising agent would have formed had the activator component not been added.

Typical doses of activator component may range from 0.1 ppm based on weight of activator on volume of aqueous suspension of solids. Preferably the activator component should be introduced at a dose in an amount of at least 1 ppm. The activator component can be effective at low levels for example between 1 and 10 ppm. Generally the activator component will be added in an amount of from at least 100 ppm and in some cases may be at least 1000 ppm based on the volume of the aqueous suspension. In some cases it may be desirable to add significantly higher levels of the activator component, for instance as much as 40,000 or 50,000 ppm or higher. Effective doses usually will be in the range between 150 and 20,000 ppm, especially between 1000 and 15,000 ppm.

Preferably the activator component of the at least one control agent is selected from the group consisting of iron (II) ions (Fe2+) (ferrous ions), iron (III) ions (Fe3+) (ferric ions), iron (IV) ions (Fe4+) (ferry) ions) and copper (II) ions (Cu2+) (cupric ions). Typically the iron (II), iron (III), iron (IV) or copper (II) ions may be employed in the form of suitable salts of the respective ions. Such salts may for instance be iron (II) sulphate, iron (II) nitrate, iron (II) phosphate, iron (II) chloride, iron (III) sulphate, iron (III) nitrate, iron (III) phosphate, iron (III) chloride, iron (IV) sulphate, iron (IV) nitrate, iron (IV) phosphate, iron (IV) chloride, copper (II) sulphate, copper (II) nitrate, copper (II) phosphate, copper (II) chloride. The respective ions tend to interact with the oxidising agent to more rapidly generate suitable reactive radicals thereby accelerating the effect of the oxidising agent. For instance iron (II) ions and copper (II) ions tend to interact with peroxides to promote the rapid formation of the hydroperoxyl radical (.OOH) and hydroxyl radical (.OH) which is an extremely powerful oxidising agent.

It may be desirable to use a combination of different activator components all one or a combination of compounds which liberate suitable activator components. For instance a compound in a high oxidation state may be used in combination with copper (I) containing compounds to generate copper (II) compounds. For instance, ferric chloride may be used in combination with copper (I) chloride thereby generating ferrous chloride and cupric chloride. Such compounds which may be precursors to activator components or which may be converted into activator components are also to be regarded as activator components within the meaning of the present invention.

The suppressor component may be any material or other entity which reduces the concentration of the at least one activator component. Suitably the suppressor component may include material selected from at least one of the group consisting of:

i) radical quencher,
ii) sequestering agent; and
iii) metal salts that promote the formation of side and deactivated (complexes) species.

Radical quenchers tend to be chemical compounds which remove radicals from the environment in which they exist. Suitably the radical quenchers include compounds, such as sodium bisulphite. Radical quenchers tend to reduce the effect of the activator component.

Sequestering agents may include any compound which is capable of chelating or sequestering the activated components, for instance metal ions. Suitable sequestering agents include EDTA (ethylenediamine tetra acetic acid or salts thereof, for instance the tetra sodium salt); ethylenediamine; DTPA (diethylene triamine pentaacetic acid or salts thereof, for instance the penta sodium salt); HEDPA (hydroxyethylidene diphosphonic acids or salts thereof, for instance the tetra sodium salt); NIL (nitrilotriacetic acid or salts thereof, for instance the tri sodium salt); ATMP (amino trimethylene phosphonic acid or salts thereof, for instance the hexa sodium salt); EDTMPA (ethylene diamine tetra methylene phosphonic acid or salts thereof, for instance the octa sodium salt); DTPMPA (diethylene triamine penta methylene phosphonic acid or salts thereof, for instance the deca sodium salt); PBTCA (2-phosphonobutane-1,2,4-tricarboxylic acid or salts thereof, for instance the penta sodium salt); polyhydric alcohol phosphate ester; 2-hydroxy phosphono carboxylic acid or salts thereof, for instance the di sodium salt; and BHMTPMPA (Bis(hexamethylene triamine penta (methylene phosphonic acid)) or salts thereof, for instance the deca sodium salt).

Metal salts that promote the formation of side and deactivated (complexes) species salts of magnesium (II) and manganese (II).

Metal salts such as salts of magnesium (II) and manganese (II) include for instance magnesium (II) sulphate, magnesium (II) nitrate, magnesium (II) phosphate, magnesium (II) chloride, manganese (II) sulphate, manganese (II) nitrate, manganese (II) phosphate, manganese (II) chloride. These compounds serve to reduce the oxidising power of the oxidising agent.

In this second aspect of the process the agent and the organic polymeric flocculant may be added to the suspension sequentially or simultaneously. Some operations may work better if the support agent is added subsequent to the polymeric flocculant. This may be especially so if the support agent acts relatively quickly since sufficient time must be allowed to first substantially form the flocculated structure before any substantial effects of the support agent occur. In this case it is preferred that the support agent is added into the layer or bed of solids formed during solid liquid separation.

However, in some situations the support agent, and where added the control agent, may be applied to the suspension prior to or substantially simultaneously with adding the organic polymeric flocculant. It may be desirable in certain situations to add the support agent before any substantial formation of the flocculated structure as this may enable the agent to be distributed throughout the subsequently formed flocculated structure.

Addition of the support agent, and where added the control agent, and the flocculant simultaneously may also provide the advantage of a single addition point especially if the support agent and the flocculant are premixed. However, with mixtures of support agent and flocculant it may be necessary to ensure that the mixture is applied to the suspension prior to any significant deleterious effects of the support agent on the flocculant. It is preferable to add the support agent after the addition of the flocculant and even after the formation of a flocculated structure. Generally, the flocculated solids would settle to form a layer or bed of settled solids. The most preferred addition point for the support agent is directly into the layer or bed of solids.

The support agent, and where added the control agent, may be added in a manner similar to that described in WO 2011/125047 or as described in European patent application 12178645.3 (unpublished at the date of filing). Furthermore, ultrasonic energy may be employed in the manner indicated any European patent application 13165652.2 (unpublished at the date of filing).

The flocculation system of the present invention may be applied to or prior to at least one of the solid liquid separation stages. Further, the flocculation system may be applied to or prior to all of the solid liquid separation stages of the present process.

Unexpectedly the process of the present invention employing the flocculation system described herein brings about significant improvements in solid liquid separation efficiencies and furthermore improves recovery of metal values and/or reduced process costs that cannot be achieved with conventional flocculants in the split circuit metal leaching and metal extraction processes.

It is preferred to apply the flocculation system to or prior to either or both of the final or penultimate solid liquid separation stages of the CCD arrangement. Furthermore, significant improvements have been found by applying the flocculation system of the present invention only to or prior to the solid liquid separation stages of the CCD arrangement. What is more surprising is that significant improvements over prior art systems are still exhibited in the flocculation system of the present invention when it is only applied to the final or penultimate solid liquid separation stages or more preferably both the final and penultimate stages. The inventors have found that by even only applying the flocculation system to or prior to either or both of these final and penultimate stages solid liquid separation stages of the CCD arrangement significant improvements in metal recovery and leaching agent recovery have been observed.

It is especially preferred that the flocculation system according to the first aspect of the invention is applied to or prior to at least one of the solid liquid separation stages of the CCD arrangement except the final of the solid liquid separation stages of the CCD arrangement and that the flocculation system according to the second aspect of the invention is added to or prior to the final solid liquid separation stage of the CCD arrangement. More preferably still, the flocculation system according to the first aspect of the invention would be added to or prior to all of the solid liquid separation stages of the CCD arrangement except the final one and the flocculation system according to the second aspect of the invention added to or prior to the final solid liquid separation stage of the CCD arrangement. Thus in this especially preferred embodiment an ATBS polymer may be added to or prior to any number or all of the separation stages of the solid liquid separation stages of the CCD arrangement except the final stage and an organic polymeric flocculant and support agent added to or prior to the final solid liquid separation stage of the CCD arrangement.

By applying the flocculation system to or prior to at least one of the flocculation stages of the CCD arrangement as described hereinabove, it has been found that the number of CCD solid liquid separation stages can be reduced by at least one and in some cases by two. This would bring about significant improvements in terms of the operational cost of maintaining the CCD arrangement and also consumption of flocculating chemicals for the solid liquid separation.

Aqueous leach pulps from the leaching operations (i.e. the leaching stage) tend to comprise a mixture of leached solids and aqueous leach solution. Aqueous leach solutions would normally comprise water, a leaching agent and a metal. The aqueous leach solutions may additionally contain other metals, impurities and a small quantity of residual leached solids. The leached solids are the residues resulting from leaching of the metal bearing material (e.g. metal bearing ores). Aqueous leach pulps may be obtained from the treatment of ground or milled ores with aqueous solution of a leaching agent.

The flowing of aqueous leach pulps, aqueous leach solutions, raffinates and other streams described in the process of the present invention may be achieved by conveying them respectively in pipes or any other natural or man-made conduit.

The manner in which solid liquid separation is carried out is not especially critical. For instance, solids can be separated from liquids by methods including, but not limited to, decantation and/or centrifugation and/or filtration. Decantation is preferred.

The process according to the present invention can be used in any metal recovery operation which employs an aqueous leaching operation (often referred to as an aqueous agitation leaching operation) where the leaching agent is regenerated in the solvent extraction process. Thus, the processes according to the present invention can be applicable to any metal leached by aqueous solution. Such metals include the transition metals. The processes according to the present invention are preferably employed in the leaching of metals which occur naturally as oxide and/or sulphide ores. The processes according to the present invention are most preferably used in the leaching of divalent metal ores. Such metals include copper, zinc, cobalt and nickel. The processes according to the present invention are most preferably used for the leaching of copper.

The aqueous leach solutions treated in the processes according to the present invention contains a leaching agent which is capable of leaching the metal from the ore. The processes according to the present invention are applicable to leaching operations wherein an aqueous leaching agent is employed. In certain preferred embodiments of the present invention the leaching agent comprises sulphuric acid. In those preferred embodiments of the present invention where the metal comprises copper, it is preferred that sulphuric acid be used as the leaching agent. Other leaching agents which can be used in the process of the present invention include, but are not limited to acids such as hydrochloric acid, nitric acid, organic acids and combinations thereof, and basic substances such as ammonia (i.e. ammonium hydroxide when combined with water). Essentially, any leaching agent, which is water miscible, capable of leaching the metal from the ore and which produces a water-soluble leaching agent metal compound, can be used.

In the process of the present invention the first clarified aqueous leach solution is typically subjected to solvent extraction without any significant dilution. In this respect the first clarified aqueous leach solution may be flowed directly to solvent extraction from the first solid liquid separation stage (i.e. first solid liquid separation stage following the leaching step). Suitably the only clarified aqueous solutions that are significantly diluted may be at least one of the further clarified aqueous leach solutions.

By significant dilution we mean the addition of a measurable amount of water or other aqueous solution to an aqueous leach solution. Accordingly, significant dilution of at least one of the further aqueous leach solutions generally refers to the addition of water or other aqueous solution to that further aqueous leach pulp in an amount such that the concentration of metal in the first clarified aqueous leach solution is greater than the concentration of the metal in at least one of the further clarified aqueous leach solutions. In preferred embodiments of the present invention, the concentration of metal in the first clarified aqueous leach solution is at least 20% greater, at least 30% greater, at least 40% greater, at least 50% greater, at least 60% greater, at least 70% greater, at least 80% greater, at least 90% greater, at least 100% greater, at least 200% greater, at least 300% greater, at least 400% greater, and the 500% greater, or even higher than the concentration of the metal in the at least one of the further clarified aqueous leach solutions. In most preferred embodiment of the present invention, the first clarified aqueous leach solution is subjected to solvent extraction without any dilution. However, it is to be understood that water or other aqueous solution can be added to the first clarified aqueous leach solution prior to the solvent extraction, but only in such amounts that the concentrations of metal in its first clarified aqueous leach solution prior to solvent extraction remains greater than the concentration of the metal in any of the further clarified aqueous leach solutions. However, as increasing dilution of the first clarified aqueous leach solution decreases leaching agent recovery, less dilution is preferred.

Solvent extraction in accordance with the process of the present invention can be carried out in any known manner wherein aqueous leach solution is contacted with the organic phase containing a metal extraction reagent. Each extraction performed in accordance with the present invention can be carried out by mixing the organic phase and the aqueous leach agent and allowing the two phases to settle. This mixing-settling can be carried out in multiple series of mixing-settling tanks with counter current flow of the aqueous and non-aqueous phases.

The aqueous phase resulting from a solvent extraction operation is referred to as a raffinate. In the processes according to the present invention, the first clarified aqueous leach solution is subjected to solvent extraction as indicated above and a first aqueous raffinate is obtained. In the processes according to the present invention the at least one further clarified aqueous leach solutions, optionally with dilution with an aqueous stream, is subjected to solvent extraction as indicated above and at least one further aqueous raffinate is obtained. The first raffinate produced in accordance with the processes of the present invention will generally have a leaching agent concentration which is greater than the concentration of leaching agent present in any of the least one further raffinates. In preferred embodiments of the present invention, the first raffinate will have a leaching agent concentration which is at least 10% greater than the concentration of leaching agent present in the at least one further raffinate. In certain more preferred embodiments of the present invention, the first raffinate will have a leaching agent concentration which is at least 20% greater, 30% greater, 40% greater, 50% greater, 60% greater, 70% greater, 80% greater, 90% greater, 100% greater, 200% greater, or more than the concentration of the leaching agent present at least one of the further raffinates.

In the processes according to the present invention, at least one of the aqueous leach solutions may be diluted prior to being subjected to solvent extraction. This may be achieved by addition of water or an aqueous solution to the second aqueous leach pulp prior to solid liquid separation.

Thus the second aqueous leach pulp may be diluted with an aqueous stream. The aqueous stream for diluting the second aqueous leach pulp can comprise fresh water introduced into the process, at least a portion of the at least one further aqueous raffinate, or combinations thereof. In certain preferred embodiments of the present invention, the second aqueous leach pulp is diluted with at least a portion of the second aqueous raffinate. Where the leaching agent comprises an acid, the second or any further aqueous raffinate can be at least partly neutralised before its use for diluting the second aqueous leach pulp. Neutralisation can be accomplished by the addition of any basic substance. In those embodiments wherein the leaching agent comprises sulphuric acid, lime is the preferred neutralisation agent. Further, neutralisation need not be complete. Typically a suitable pH range for the partly neutralised second for further raffinate is any pH up to about 8, for instance 6 to 7.5 or 8.

In the present inventive process it may be desirable to bleed a portion of the second or further aqueous raffinate from the circuit to maintain water balance. Additionally, in certain preferred embodiments of the present invention, at least a portion of the first aqueous raffinate is recycled to a leaching operation where the leaching agent contained therein is employed to leach further metal from ore. In more preferred embodiments, at least a portion of the second aqueous raffinate is recycled to the same leaching operation from which the aqueous leach solution was obtained. In even more preferred embodiments of the present invention at least a portion of both the first and second aqueous raffinates are recycled to a leaching operation where the leaching agent contained therein is employed to leach more metal from ore. In still yet more preferred embodiments, at least a portion of both the first and second or further aqueous raffinates are recycled to the same leaching operation from which the aqueous leach solution was obtained.

In one embodiment of the inventive process the first clarified aqueous leach solution and the at least one further clarified aqueous leach solution may be fed into separate solution extraction (solvent extraction) plants each with separate stripping units. Nevertheless, it may be preferable to direct at least two of these clarified aqueous leach solutions to a single solution extraction plant which has the requisite number of extraction units to deal with the respective streams of clarified aqueous leach solutions. Thus the first clarified aqueous leach solution and the at least one further clarified aqueous leach solutions are both or all (if there are more than two) fed into a single solution extraction plant comprising at least two solution extractors and least one stripping unit. It may also be desirable for the extraction plant to further include at least one wash stage.

In one illustration of using a single solution extraction plant, a first clarified aqueous leach solution (which may be regarded as an HGPLS) may be fed to a solution extractor unit within a single solution extraction plant; then producing a raffinate (which may be regarded as a high grade raffinate) and a metal loaded organic solution by contacting the first clarified aqueous leach solution with a partially loaded organic solution in the solution extractor; providing a further clarified aqueous leach solution (which may be regarded as a LGPLS) to a different solution extractor unit within the same solution extractor plant; then producing a raffinate (a low-grade raffinate) and the partially loaded organic solution by contacting the further clarified aqueous leach solution with a barren organic flow containing a metal extraction reagent. The flow rate of the organic flow and the reagent concentration may be varied in order to maintain a constant recovery across extraction. This may be regarded as maintaining the residual metal content in the exiting aqueous raffinate to a desire value. In this respect the concentration of metal in the further clarified aqueous leach solution may be adjusted by blending a portion of the further clarified aqueous leach solution with the first clarified aqueous leach solution so that the quantity of metal entering the extraction circuit for the further clarified aqueous leach solution remains substantially constant.

The further solid liquid separation operation of the present process may comprise solid liquid separation stages that are entirely part of the CCD arrangement. With this process feature it may be desirable that only one further clarified aqueous leach solution is produced. Generally, this would be from the first solid liquid separation stage of the CCD arrangement. Thus in this aspect of the inventive process there would be a stream of the first clarified aqueous leach solution and a stream of the further clarified aqueous leach solution. These two streams would be fed to solvent extraction. Typically it would be possible to employ an interlocked series of extraction stages, wash stages and strip stages as a solvent extraction train. A solvent extraction plant may have a number of trains. The further aqueous raffinate produced by solvent extraction of the further clarified aqueous leach solution may be recycled into the final stage of the CCD arrangement.

In a variant of the present process it may be desirable that the further solid liquid separation operation of the present process comprises an intermediate solid liquid separation stage which is not part of the CCD arrangement with subsequent solid liquid separation stages which are part of the CCD arrangement. Two further clarified aqueous leach solutions may be produced comprising a second clarified aqueous leach solution resulting from the intermediate solid liquid separation stage (i.e. which is not part of the CCD arrangement), and a tertiary clarified aqueous leach solution resulting from the first of its solid liquid separation stages of the CCD arrangement. Suitably the second and third clarified aqueous leach solutions would then both be subjected to solvent extraction to produce a second raffinate and a third raffinate respectively. The three streams of first, second and third aqueous leach solutions desirably would be fed to separate extractor units, optionally within one or more solution extractor plants (trains). It may be desirable to feed at least a portion of the second aqueous raffinate into either or both of the second aqueous leach pulp or the first aqueous leach pulp. Preferably essentially all of the second raffinate is fed into the second aqueous leach pulp. Typically in this arrangement the first aqueous raffinate would be recycled to the first aqueous leach pulp; the second aqueous raffinate would be recycled to the second aqueous leach pulp; and the third aqueous raffinate would be recycled to the final solid liquid separation stage of the CCD arrangement.

Figure 2:
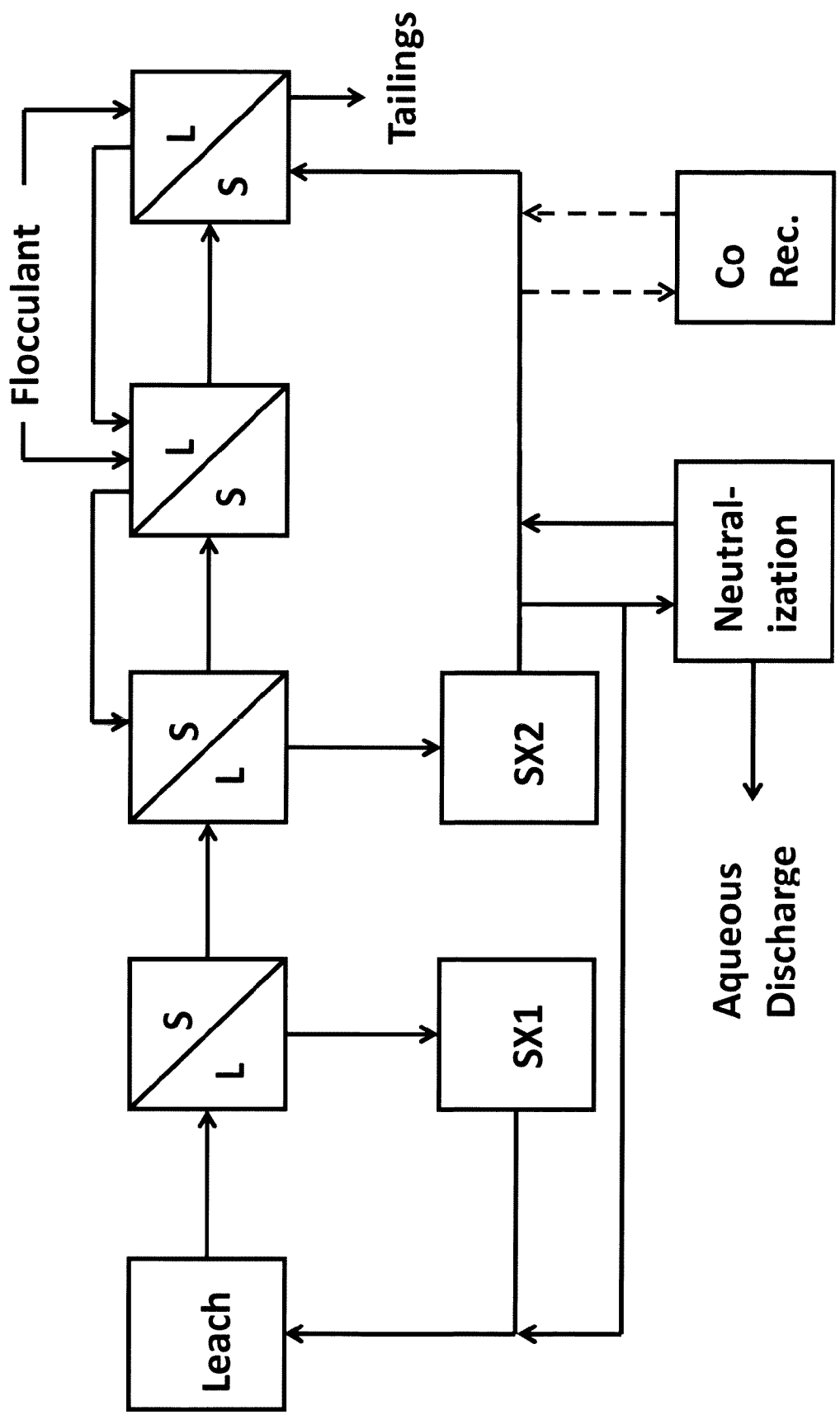
FIG. 2 represents a preferred embodiment of the invention in which the flocculation system is applied to the last two solid liquid separation stages of the CCD arrangement.
Figure 3:
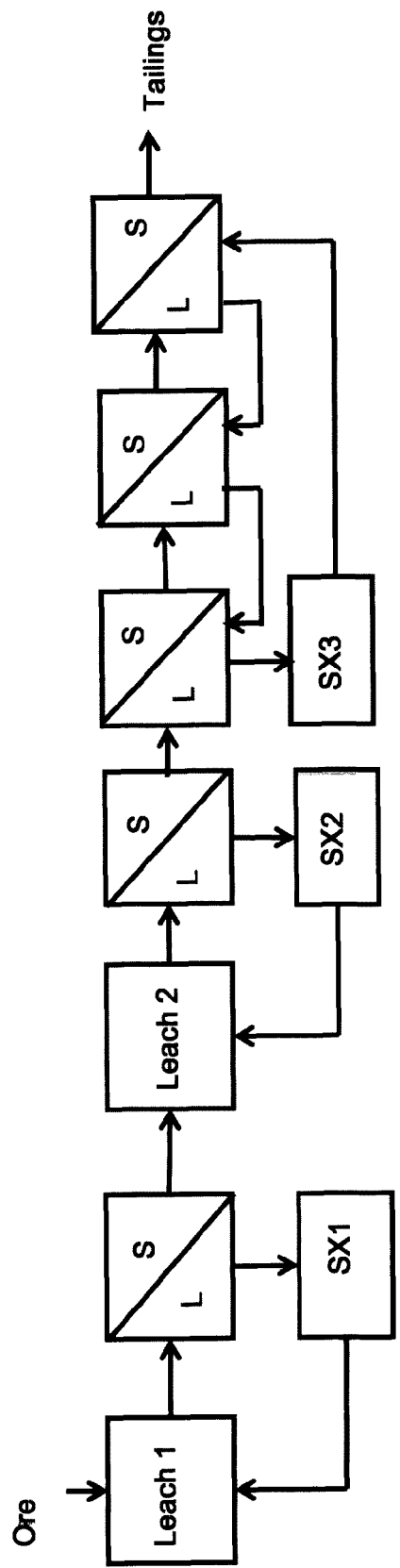
FIG. 3 represents a variation on the process of the present invention in which the first further solid liquid separation stage is not part of the CCD arrangement.

As an illustration of the present invention reference is made to FIGS. 1 to 3

FIG. 1 describes a suitable metal leach and recovery process according to the invention. PLT is a pre-leaching washing stage carried out on the metal bearing material (not essential to the process). LEACH is the leaching stage in which leaching agent is combined with the metal bearing material. SLS is the first solid liquid separation step providing a first clarified aqueous leach solution and a second aqueous leach pulp. CCD1, CCD2-4, and CCD5 are all further solid liquid separation stages and all part of the CCD arrangement. CCD2-4 is a diagrammatic representation of the three solid liquid separation stages CCD2, CCD3 and CCD4. High-Grade SX1 is a solvent extraction unit for the first aqueous leach solution produced from SLS. Low-Grade SX2 is the solvent extraction unit for the further aqueous leach solution produced by CCD1

The solvent extraction process is typically composed of two operations; extraction and stripping. In extraction, the metal should be transferred into the organic phase from the PLS (pregnant leach solution) and in stripping, the metal is generally transferred from the metal loaded organic phase into an aqueous solution from which the metal can then be recovered. In terms of copper, the stripping process will typically involve contacting the metal loaded organic with a lean electrolyte containing 30-40 gpl of copper and 175-200 gpl of sulphuric acid. The exact amounts of copper and acid would be dependent on the operating conditions in electrowinning. The stripping process suitably result in an essentially metal barren organic phase which returns to extraction and a rich electrolyte containing 40-50 gpl of copper and 150-160 gpl of acid. The rich electrolyte can be fed to electrowinning where the copper would be recovered as copper metal and a lean electrolyte is generated which returns to stripping.

FIG. 2 represents one preferred embodiment of the present invention in which the flocculation system (Flocculant) is applied to the last two stages of the CCD arrangement. A first leaching stage is shown (Leaching) from which a first aqueous leach pulp would be passed to a first solid liquid separation stage (L\S). A first aqueous leach solution would be produced from this first solid liquid separation stage and passed to solvent extraction (SX1); an aqueous raffinate produced from this stage would be recycled into Leaching. A second aqueous leach pulp resulting from the first solid liquid separation stage would be passed to further solid liquid separation stages in sequence represented by three boxes (L\S) in a CCD arrangement. A further aqueous leach solution would be produced from the first of these further solid liquid separation stages and then passed to solvent extraction (SX2). An aqueous raffinate produced from this solvent extraction is indicated as being recycled to the last stage of the CCD arrangement. Neutralisation is an optional stage in cases where the raffinate may be too acidic. Tailings represents the solids resulting from the final solid liquid separation stage of the CCD arrangement, removed from the process. Co Recovery represents an optional process for the recovery of cobalt.

In some cases certain ores may contain a second metal. Certain high-grade copper oxide type ore deposits contain smaller amount of cobalt. In such cases the copper would be extracted personally and the cobalt can be recovered by treating a bleed stream of the second or further aqueous raffinate from the second solvent extraction and then precipitate the cobalt as a salt, such as cobalt sulphide. It may also be desirable to extract cobalt from the neutralised bleed stream with a solvent extraction reagent such as an organophosphinic acid. In this case the cobalt depleted aqueous liquid would be returned to the second or further aqueous raffinate stream prior to the addition to the CCD train.

FIG. 3 represents a variation on the process of the present invention in which the first further solid liquid separation stage is not part of the CCD arrangement. Metal bearing material is fed into leaching stage (Leach 1) and then subjected to first solid liquid separation represented by the first box from the left marked (L\S); the first clarified aqueous leach solution is then passed to solvent extraction (SX1) from which the first aqueous raffinate is recycled to Leach 1. A second aqueous leach pulp resulting from the first solid liquid separation stage is then passed to a second leaching stage (Leach 2) and then subjected to a second solid liquid separation step represented by the second box from the left marked (L\S); the second clarified aqueous leach solution is then passed to solvent extraction (SX2) from which at least a portion of the second aqueous raffinate is recycled to Leach 2; a portion may also go to Leach 1. The solids resulting from this second solid liquid separation step is passed to a series of solid liquid separation stages in a CCD arrangement in which a third clarified aqueous leach solution is produced and passed to solvent extraction (SX3); the aqueous raffinate from this stage is recycled to the last solid liquid separation stage of the CCD arrangement. The solids resulting from this stage would be removed from the process, indicated as Tailings. In accordance with the process of the present invention the flocculation system may be added to or prior to any number of the solid liquid separation stages or even all of the solid liquid separation stages.

Typical flocculation systems according to the present invention which can be used in conjunction with any of the solid liquid separation stages, especially either or both of the last two solid liquid separation stages of the CCD train, of the illustrations according to FIGS. 1 to 3 are as follows:

Description of Polymers which may be used:

Polymer A—a sodium polyacrylate of approximately 15,000,000 molecular weight;

Polymer B—an acrylamide homopolymer of approximately 15,000,000 molecular weight;

Polymer C—a sodium salt of 2-acrylamido-2-propane sulphonic acid (ATBS)/acrylamide copolymer of approximately 15,000,000 molecular weight;

Polymer D—sodium acrylate/acrylamide 10/90 weight/weight copolymer of approximately 15,000,000 molecular weight;

Polymer E—sodium acrylate/acrylamide 30/70 weight/weight copolymer of approximately 15,000,000 molecular weight;

Polymer F—sodium acrylate/acrylamide 50/50 weight/weight copolymer of approximately 20,000,000 molecular weight;

Polymer G—sodium acrylate/acrylamide 30/70 weight/weight copolymer of approximately 17,000,000 molecular weight;

Polymer H—methyl chloride quaternised dimethyl amino ethyl acrylate/acrylamide 60/40 weight/weight copolymer of approximately 12,000,000 molecular weight.

All polymers would have an intrinsic viscosity of greater than 4 dl/g.

Suitable support agents which may be used

Agent 1—Hydrogen peroxide aqueous solution (30% by weight);

Agent 2—Sodium perborate;

Agent 3—Sodium hypochlorite;

Agent 4—Sodium persulphate;

Agent 5—Sodium metabisulphite;

Agent 6—sodium sulphite;

Agent 7—ammonium persulphate;

Agent 8—sodium nitrite;

Agent 9—sodium nitrate;

Agent 10—Ozone water (10% by weight)

In all cases the polymer would be applied directly to the feedwell of the solid liquid separation stage. The support agent would most desirably be added directly into the bed of settled solids. The systems of the invention would enhance metal recovery and leach recovery and/or reduce the number of solid liquid separation stages required in the CCD train by comparison to employing conventional flocculation systems not according to the invention.

EXAMPLE 1

A sample of the suspension from the feed to the final solid liquid separation stage of the countercurrent decantation arrangement of a metal leach and recovery process was extracted and used in solid liquid separation tests.

The following polymers were used as the flocculant:
Polymer B
Polymer G
Polymer C
wherein the definition of the respective polymers is provided above. As the support agent either ozone or ozone and sodium hypochlorite were employed as follows:

| Flocculant | Support Agent |
| --- | --- |
| Polymer B | Ozone |
| Polymer C | Ozone and sodium hypochlorite |
| Polymer G | Ozone and sodium hypochlorite |

The results of the tests indicated an improved metal and leach process using the flocculation system of the invention.

The invention claimed is:

1. A metal leach and recovery process comprising:
    (a) subjecting a metal bearing material to a reactive process by combining said metal bearing material with a leaching agent to liberate at least one metal value from said metal bearing material and obtain a first aqueous leach pulp comprising a mixture of leached solids and an aqueous leach solution comprising at least one metal value, a leaching agent and water;
    (b) subjecting the first aqueous leach pulp to a solid liquid separation step to provide a first clarified aqueous leach solution and a second aqueous leach pulp, wherein the second aqueous leach pulp comprises a greater solids content than the first aqueous leach pulp;
    (c) subjecting the first clarified aqueous leach solution to solvent extraction thereby obtaining a first aqueous raffinate;
    (d) subjecting the second aqueous leach pulp to at least two further solid liquid separation steps of which some or all of the further solid liquid separation steps are in a counter current decantation (CCD) arrangement in which each solid liquid separation step of the CCD arrangement results in an aqueous liquor and an aqueous suspension of solids, wherein each aqueous suspension of solids resulting from each solid liquid separation step of the CCD arrangement is passed to the subsequent solid liquid separation step of the CCD arrangement and the aqueous suspension of solids resulting from the final solid liquid separation step of the CCD arrangement is removed from the process and wherein each aqueous liquor resulting from each solid liquid separation step of the CCD arrangement is passed to the previous solid liquid separation step, in which at least one further clarified aqueous leach solution results from at least one of the further solid liquid separation steps;
    (e) subjecting the at least one further clarified aqueous leach solution to solvent extraction thereby obtaining at least one further aqueous raffinate;
    (f) feeding at least a portion of the one or more of the at least one further aqueous raffinates into the final solid liquid separation step of the CCD arrangement;
    wherein at least one of the solid liquid separation steps is subjected to a flocculation system in which the flocculation system comprises either:
    (i) addition of an organic polymeric flocculant to or prior to at least one solid liquid separation step, which polymeric flocculant is formed from 2-acrylamido-2-methylpropane sulphonic acid (ATBS) or salts thereof as a homopolymer or copolymer with at least one water-soluble ethylenically unsaturated monomer; or
    (ii) addition of an organic polymeric flocculant and at least one support agent to or prior to at least one solid liquid separation step, which at least one support agent is selected from at least one of the group consisting of oxidising agents, reducing agents, irradiation and free radical producing agents.

2. A process according to claim 1 in which the organic polymeric flocculant is a copolymer of ATBS and either acrylamide or methacrylamide.

3. A process according to claim 1 in which the organic polymeric flocculant is a copolymer of sodium acrylate and either acrylamide or methacrylamide and used in conjunction with the support agent.

4. A process according to claim 1 in which the organic polymeric flocculant is used in conjunction with an oxidising agent, preferably hydrogen peroxide or ozone.

5. A process according to claim 1 in which the organic polymeric flocculant is used in conjunction with irradiation, preferably ultrasonic irradiation.

6. A process according to claim 1 in which the support agent is used in conjunction with at least one control agent, in which the at least one control agent consists of iia) at least one activator component and/or iib) at least one suppressor component, in which the at least one activator component increases the activity of the oxidising agent and the suppressor component decreases the concentration of the activator component.

7. A process according to claim 1 in which the organic polymeric flocculant exhibits an intrinsic viscosity of at least 4 dl/g.

8. A process according to claim 1 in which the flocculation system is applied to either or both of the final or penultimate solid liquid separation stages of the CCD arrangement.

9. A process according to claim 1 in which the first clarified aqueous leach solution and the at least one further clarified aqueous leach solutions are both/all fed to a solution extraction plant comprising at least two solution extractors and at least one stripping unit.

10. A process according to claim 1 in which the second leach pulp is subjected to a further leach stage and then passed to further solid liquid separation stages in which the further solid liquid separation stages comprise an intermediate solid liquid separation stage which is not part of the CCD and subsequent solid liquid separation stages which are part of the CCD arrangement,
    wherein two further clarified aqueous leach solutions are produced comprising a second clarified aqueous leach solution resulting from the intermediate solid liquid separation stage which is not part of the CCD arrangement and a tertiary clarified aqueous leach solution resulting from the first of the solid liquid separation stages of the CCD arrangement,
    in which the second and the third clarified aqueous leach solutions are both subjected to solvent extraction to produce a second raffinate and a third raffinate.

11. A process according to claim 10 in which at least a portion of the second raffinate is fed into either or both of the second aqueous leach pulp or the first aqueous leach pulp.

12. A process according to claim 10 in which essentially all of the second raffinate is fed into the second aqueous leach pulp.

* * * * *